US 11,158,118 B2

(12) United States Patent
Esposito et al.

(10) Patent No.: US 11,158,118 B2
(45) Date of Patent: Oct. 26, 2021

(54) LANGUAGE MODEL, METHOD AND APPARATUS FOR INTERPRETING ZONING LEGAL TEXT

(71) Applicant: VIVACITY INC., San Juan, PR (US)

(72) Inventors: Matthew Esposito, Brooklyn, NY (US); Geraldine Esposito, Brooklyn, NY (US); Hector Tarrido-Picart, New York, NY (US); Cade Zacharias, San Juan, PR (US)

(73) Assignee: VIVACITY INC., San Juan, PR (US)

( * ) Notice: Subject to any disclaimer, the term of this patent is extended or adjusted under 35 U.S.C. 154(b) by 308 days.

(21) Appl. No.: 16/293,199

(22) Filed: Mar. 5, 2019

(65) Prior Publication Data

US 2019/0272324 A1 Sep. 5, 2019

Related U.S. Application Data

(60) Provisional application No. 62/638,774, filed on Mar. 5, 2018, provisional application No. 62/638,776, filed (Continued)

(51) Int. Cl.
*G06F 40/30* (2020.01)
*G06T 17/00* (2006.01)
(Continued)

(52) U.S. Cl.
CPC ............ *G06T 17/00* (2013.01); *G06F 40/242* (2020.01); *G06F 40/30* (2020.01); *G06N 3/04* (2013.01);
(Continued)

(58) Field of Classification Search
CPC ............ G06N 20/00; G06N 3/04; G06N 5/04; G06Q 50/165; G06Q 50/16; G06F 40/30;
(Continued)

(56) References Cited

U.S. PATENT DOCUMENTS 6,570,555 B1 5/2003 Prevost et al.
6,772,149 B1 * 8/2004 Morelock ............. G06F 16/334
(Continued)

OTHER PUBLICATIONS

International Search Report dated May 23, 2019 from corresponding International Application No. PCT/US2019/020758, 3 pages.
(Continued)

*Primary Examiner* — Huyen X Vo
(74) *Attorney, Agent, or Firm* — Hoglund & Pamias, PSC; Roberto J. Rios

(57) ABSTRACT

A computerized method for analyzing a zoning ordinance comprises converting the text into a raw text format; parsing the raw text format to establish a hierarchical structure; building a network representation of the text of the zoning ordinance; collecting examples of portions the zoning ordinance to be analyzed; building a language model of each subsection of the text of the zoning ordinance; running the language model on each subsection of the text of the zoning ordinance; correlating references to previously translated sections of the text of the zoning ordinance; outputting text of the zoning ordinance as a data dictionary with sections interpreted as machine readable code; and outputting simplified language sentences from the data dictionary. An assembled document comprising at least one of the machine readable code and the simplified language sentences is provided. Associated images can be included in the document. A programmed computer and a medium including computer code for practicing the method.

27 Claims, 8 Drawing Sheets

Related U.S. Application Data on Mar. 5, 2018, provisional application No. 62/639,284, filed on Mar. 6, 2018.

(51) Int. Cl.
*G06N 3/04* (2006.01)
*G06Q 50/16* (2012.01)
*G06F 40/242* (2020.01)
*G06N 20/00* (2019.01)

(52) U.S. Cl.
CPC ........... *G06Q 50/165* (2013.01); *G06N 20/00* (2019.01); *G06T 2210/04* (2013.01)

(58) Field of Classification Search
CPC .... G06F 40/205; G06F 16/3344; G06F 40/56; G06F 40/20; G06F 40/242; G06F 40/14; G06F 40/137; G06F 40/131; G06F 40/284; G06T 17/00; G06T 2210/04
See application file for complete search history.

(56) References Cited

U.S. PATENT DOCUMENTS

| | | | |
|---|---|---|---|
| 8,615,389 | B1 | 12/2013 | Marcu |
| 10,673,814 | B1* | 6/2020 | Huffner ............... H04L 63/1483 |
| 2005/0273346 | A1 | 12/2005 | Frost |
| 2006/0167876 | A1* | 7/2006 | Benitez ................. G06F 16/489 |
| 2012/0290492 | A1 | 11/2012 | Zabala Rodriguez |
| 2013/0132041 | A1 | 5/2013 | Sigaty et al. |
| 2015/0052130 | A1 | 2/2015 | Chang et al. |
| 2015/0058233 | A1* | 2/2015 | Budlong ................. G06Q 50/16 705/315 |
| 2015/0095017 | A1* | 4/2015 | Mnih .................... G06F 40/242 704/9 |
| 2015/0324496 | A1 | 11/2015 | Müller et al. |
| 2016/0110824 | A1 | 4/2016 | Zabala Rodriguez |
| 2016/0148159 | A1* | 5/2016 | Coffing ................. G06Q 10/10 705/301 |
| 2016/0232630 | A1* | 8/2016 | Admon ................. G06F 16/345 |
| 2016/0275209 | A1 | 9/2016 | Kelly et al. |
| 2017/0011548 | A1 | 1/2017 | Sigaty et al. |
| 2017/0257329 | A1 | 9/2017 | Tetreault et al. |
| 2018/0203921 | A1* | 7/2018 | Privault ................. G06F 40/30 |
| 2019/0043379 | A1* | 2/2019 | Yuan .................... G06N 3/0454 |

OTHER PUBLICATIONS

Written Opinion dated May 23, 2019 from corresponding International Application No. PCT/US2019/020758, 11 pages.

\* cited by examiner

| Hierarchical Categorization of Zoning Text | |
|---|---|
| From | To |
| Article 2 - Residential District | Parcel |
| Article 3 - Comercial District | Parcel |
| Article 4 - Manufacturing District | Parcel |
| Article 6 - Special Regulation | Article 2 - Residential District |
| Article 6 - Special Regulation | Article 3 - Comercial District |
| Article 6 - Special Regulation | Article 4 - Manufacturing District |
| Article 8 - Special Purpose District | Article 6 - Special Regulation |
| Article 9 - Special Purpose District | Article 6 - Special Regulation |
| Article 10 - Special Purpose District | Article 6 - Special Regulation |
| Article 11 - Special Purpose District | Article 6 - Special Regulation |
| Article 12 - Special Purpose District | Article 6 - Special Regulation |
| Article 13 - Special Purpose District | Article 6 - Special Regulation |
| Article 14 - Special Purpose District | Article 6 - Special Regulation |

FIG. 6A

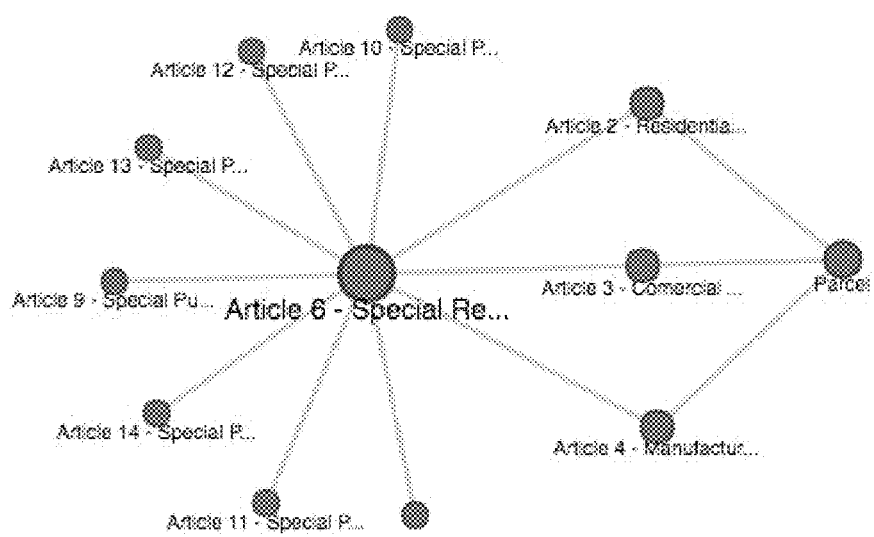

FIG. 6B

LANGUAGE MODEL, METHOD AND APPARATUS FOR INTERPRETING ZONING LEGAL TEXT

This application claims priority from, and the benefit of, provisional application Ser. Nos. 62/638,774 and 62/638,776, filed on Mar. 5, 2018 and Ser. No. 62/639,284 filed on Mar. 6, 2018. The entire contents of these application are incorporated herein by reference, for all purposes, in their entireties.

BACKGROUND OF THE DISCLOSURE

1. Field of the Disclosure

The present disclosure relates to zoning regulations. More particularly it relates to a system and a method for processing zoning ordinances into machine readable format and to providing a summary in simple, easy to understand language.

2. Description of the Related Art

A city's legal zoning text is difficult for an architect, developer or common person to navigate and decipher, given the complex syntax and complex logic structure of the text. A zoning expert or legal expert is often required to translate the complex logic into simple logic so it can become an actionable item for settling a lawsuit, acquiring capital for a new development, plan an expansion to an existing building, etc. This process takes time, usually a month or two, and can be prone to error if a specific part of the logic is misunderstood or misinterpreted.

It would be of great advantage to all of the individuals that must deal with zoning texts to automate their interpretation. This would greatly reduce the time needed to the code and facilitate the various tasks mentioned above.

SUMMARY OF THE DISCLOSURE

In general, an embodiment of the disclosure is directed to a system and a method for using algorithms and workflows associated with natural language processing to automate text interpretation and summarization for purposes of complying with zoning. This eliminates the need to depend on an expediter or lawyer as the single source of truth for interpretation and minimizes interpretation errors. This also expedites the time needed to analyze the zoning regulations for an answer to minutes, instead of weeks or months.

The disclosed computerized method for analyzing a zoning ordinances comprises optionally separating text and images and tagging the images (which may be tables or images) with a reference to a section or chapter of the code where the image was placed, converting the text into a raw text format; parsing the raw text format to establish a hierarchical structure; identifying regular expressions in the hierarchical structure for each chapter of the zoning ordinance; extracting, for each chapter of the zoning ordinance, referenced zoning ordinance chapters that point to different chapters in the zoning ordinance; storing the text in a data dictionary; building a network map indicative of the manner in which each zoning ordinance subsection and section relates to a hierarchical whole of the zoning ordinance using keys stored in the data dictionary; saving the hierarchical structure to the network as an attribute for use when assembling a zoning ordinance document; saving a corpus of example wherein the text is converted to machine code and natural language; and providing machine code and natural language for other sections of the code without loss of the sentential logic.

The network is implemented as a supervised tagged network. The network is first automatically tagged with the chapters and subsections by extracting the enumerated chapter and subsection structure of the zoning ordinance. The network is then manually tagged at the subsection level with key words that relate to standard zoning behavior (rear yards, floor area ratio (FAR), maximum height, skyplane, etc). This manual tagging creates a language model. The training teaches the network to establish a link between the syntactic dependency of a sentence and the abstract sentential logic that captures high-level logic of the sentence.

The method can further comprise, for each subsection in the parsed zoning text, tokenizing the sentences; and establishing a semantic representation of each sentence. For each sentence, an abstractive summary of the text is established.

The method can further comprise providing in an output zoning summary, for each section and subsection of the zoning ordinance, simplified sentences and paragraphs. The simplified sentences can also be provided as computer code following propositional logic.

The method can further comprise providing a visual representation of both the abstract propositional logic and syntactic dependency.

The method can further comprise separating text and images in the zoning ordinance; and tagging the images with references to the section of the zoning ordinance in which the images are located.

Storing the text in a data dictionary can comprise storing, for each subsection of the zoning ordinance, the zoning chapter identification, and the referenced zoning ordinance and chapters.

Another embodiment of the disclosure is also directed to a computer system for implementing the method for analyzing a zoning ordinance.

Yet another embodiment of the disclosure is directed to a computer readable non-transitory storage medium storing instructions of a computer program which when executed by a computer system results in performance of steps of a method for analyzing a zoning ordinance.

BRIEF DESCRIPTION OF THE DRAWINGS

FIG. 6A illustrates the manual categorization of zoning chapters according to how they would be interpreted to apply to a parcel.

FIG. 6B illustrates a hierarchical categorization of FIG. 6A as a network graph for ease of interpretation.

A component or a feature that is common to more than one drawing is indicated with the same reference number in each of the drawings.

DESCRIPTION OF THE EMBODIMENTS

Figure 1:
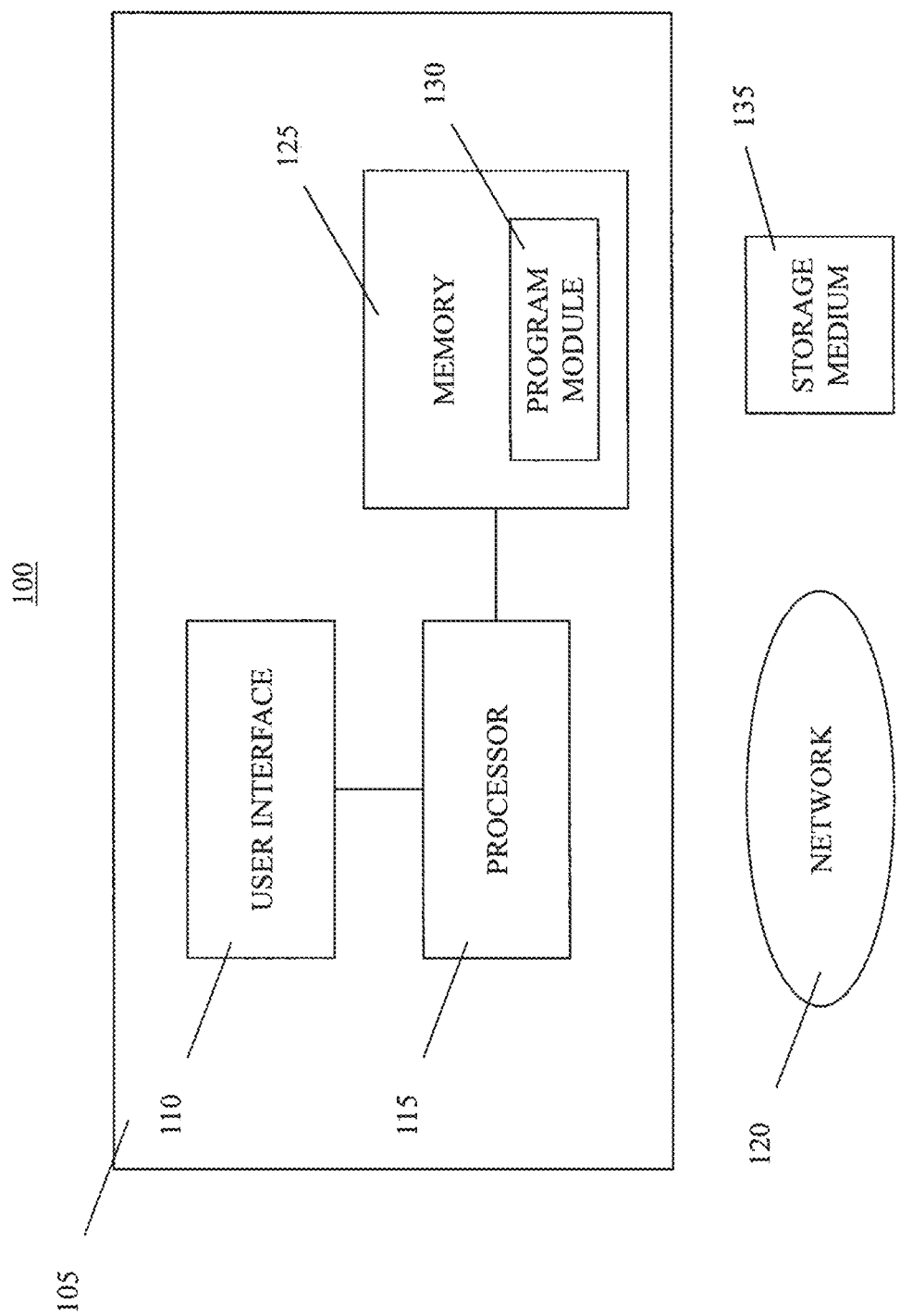
FIG. 1 is a general block diagram of computer apparatus on which the system and method disclosed herein may be implemented.

FIG. 1 is a block diagram of a computer system 100 on which the system and method of the disclosed embodiment can be implemented. System 100 includes a computer 105 coupled to a network 130, e.g., the Internet.

Computer 105 includes a user interface 110, a processor 115, and a memory 120. Computer 105 may be implemented on a general-purpose microcomputer. Although computer 105 is represented herein as a standalone device, it is not limited to such, but instead can be coupled to other devices (not shown in FIG. 1) via network 130.

Processor 115 is configured of logic circuitry that responds to and executes instructions.

Memory 120 stores data and instructions for controlling the operation of processor 115. Memory 120 may be implemented in a random access memory (RAM), a hard drive, a read only memory (ROM), or a combination thereof. One of the components of memory 120 is a program module 125.

Program module 125 contains instructions for controlling processor 115 to execute the methods described herein. The term "module" is used herein to denote a functional operation that may be embodied either as a stand-alone component or as an integrated configuration of a plurality of sub-ordinate components. Thus, program module 125 may be implemented as a single module or as a plurality of modules that operate in cooperation with one another. Moreover, although program module 125 is described herein as being installed in memory 120, and therefore being implemented in software, it could be implemented in any of hardware (e.g., electronic circuitry), firmware, software, or a combination thereof.

User interface 110 includes an input device, such as a keyboard or speech recognition subsystem, for enabling a user to communicate information and command selections to processor 115. User interface 110 also includes an output device such as a display or a printer. A cursor control such as a mouse, track-ball, or joy stick, allows the user to manipulate a cursor on the display for communicating additional information and command selections to processor 115.

Processor 115 outputs, to user interface 110, a result of an execution of the methods described herein. Alternatively, processor 115 could direct the output to a remote device (not shown) via network 130.

While program module 125 is indicated as already loaded into memory 120, it may be configured on a storage medium 135 for subsequent loading into memory 120. Storage medium 135 can be any conventional storage medium that stores program module 125 thereon in tangible form. Examples of storage medium 135 include a floppy disk, a compact disk, a magnetic tape, a read only memory, an optical storage media, universal serial bus (USB) flash drive, a digital versatile disc, or a zip drive. Alternatively, storage medium 135 can be a random access memory, or other type of electronic storage, located on a remote storage system and coupled to computer 105 via network 130.

System 100 can be almost any computer, including a personal computer of the type that can be bought at any computer store or office outlet, having currently sized RAM and hard drive. In the disclosed embodiment, software programs that are used are Python 3.0, a natural language (NPL) Python Package, such as SpaCy or any RegEX, and Pandas Library.

Figure 2:
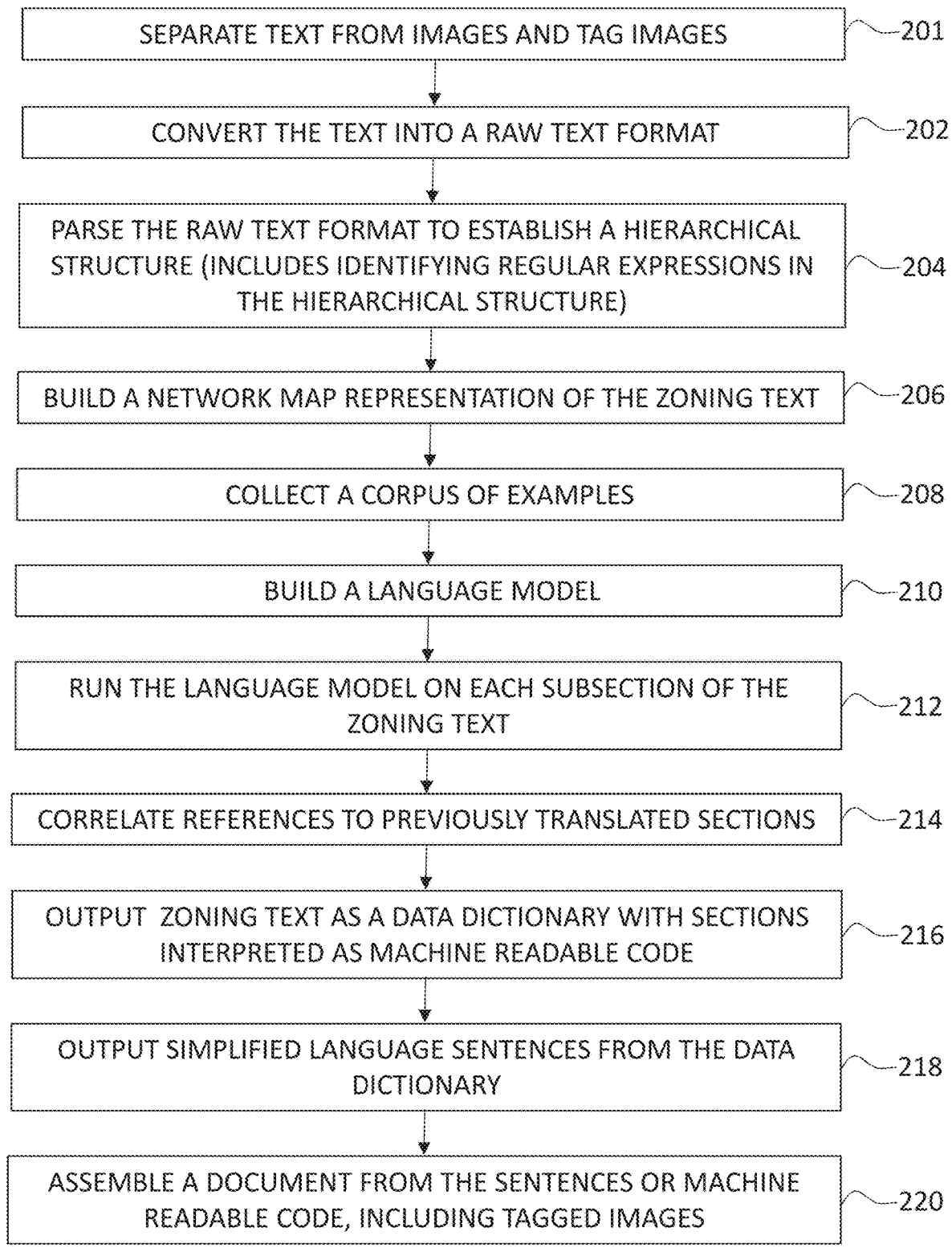
FIG. 2 is an example of flowchart of the method and system in accordance with the disclosure.

Referring to FIG. 2, at a first, optional step in the process images in the zoning ordinance (including tables, diagrams, etc.) can be separated from text of the zoning ordinance of the city being considered. Text and images from a city's zoning text are separated in order to process the logic of the text. It is noted that some zoning texts do not include any images or tables. In this case the step of separating the text and images is not performed.

Figure 3:
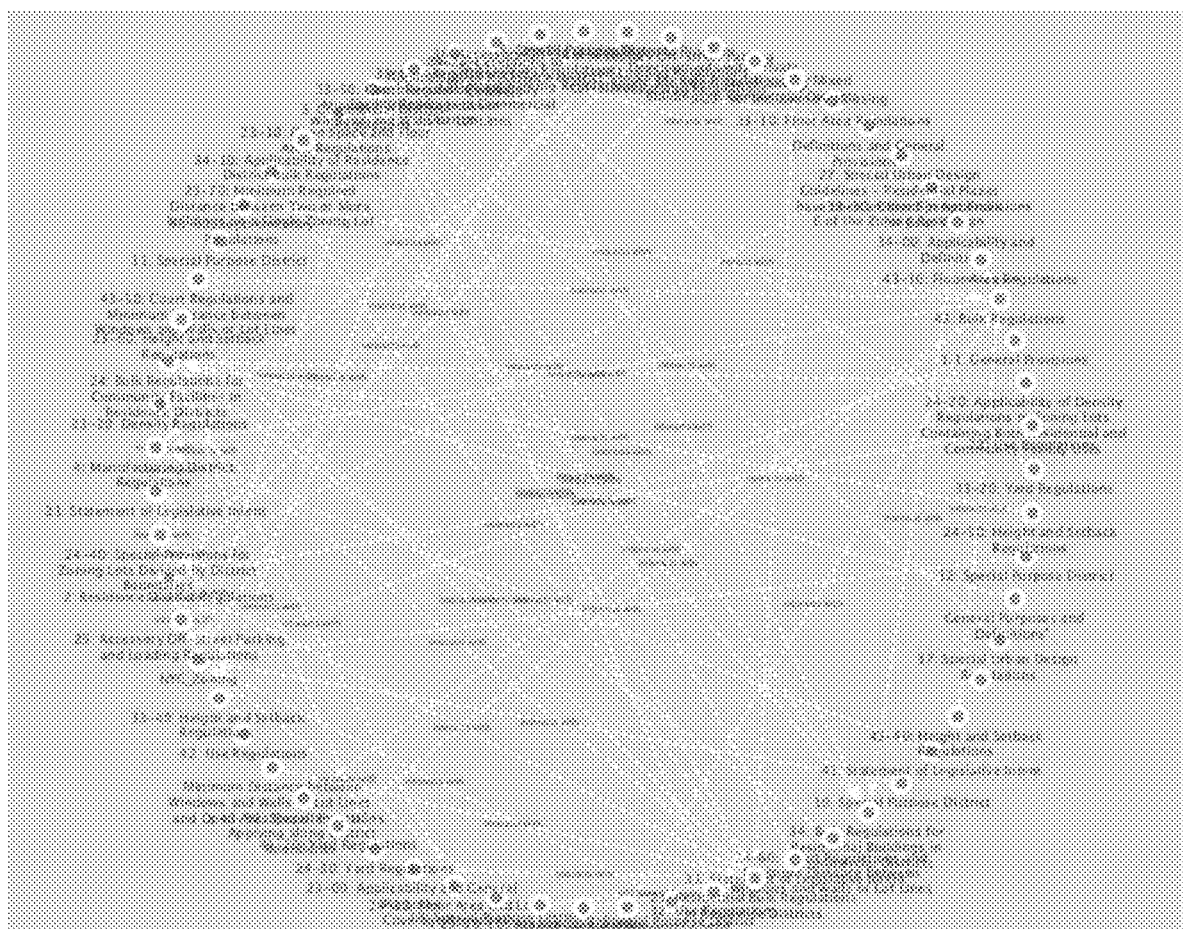
FIG. 3 illustrates an example of raw zoning text with no data dictionary hierarchy or network relationships.

When images or tables and sketches are included as part of the zoning ordinance, the images are tagged with a corresponding reference to the section or chapter were the image was placed, for storage and for later retrieval and use, as described below. At 202, text is converted into a raw text format, as represented, for example, in FIG. 3, so that it can be processed in Python. The dotted lines represent interactions between various zoning sections.

Figure 4A:
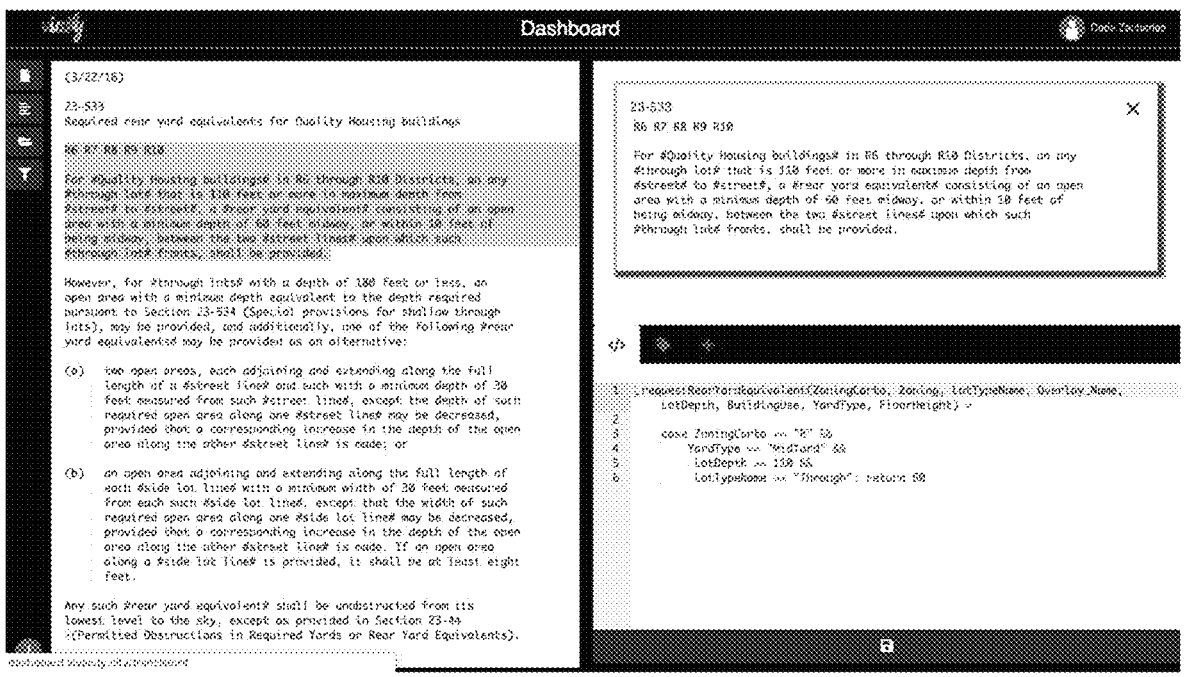
FIG. 4A is an example of a screen showing filter being applied to zoning text using a Python Regex and a supervised translation being made from the highlighted text.
Figure 4B:
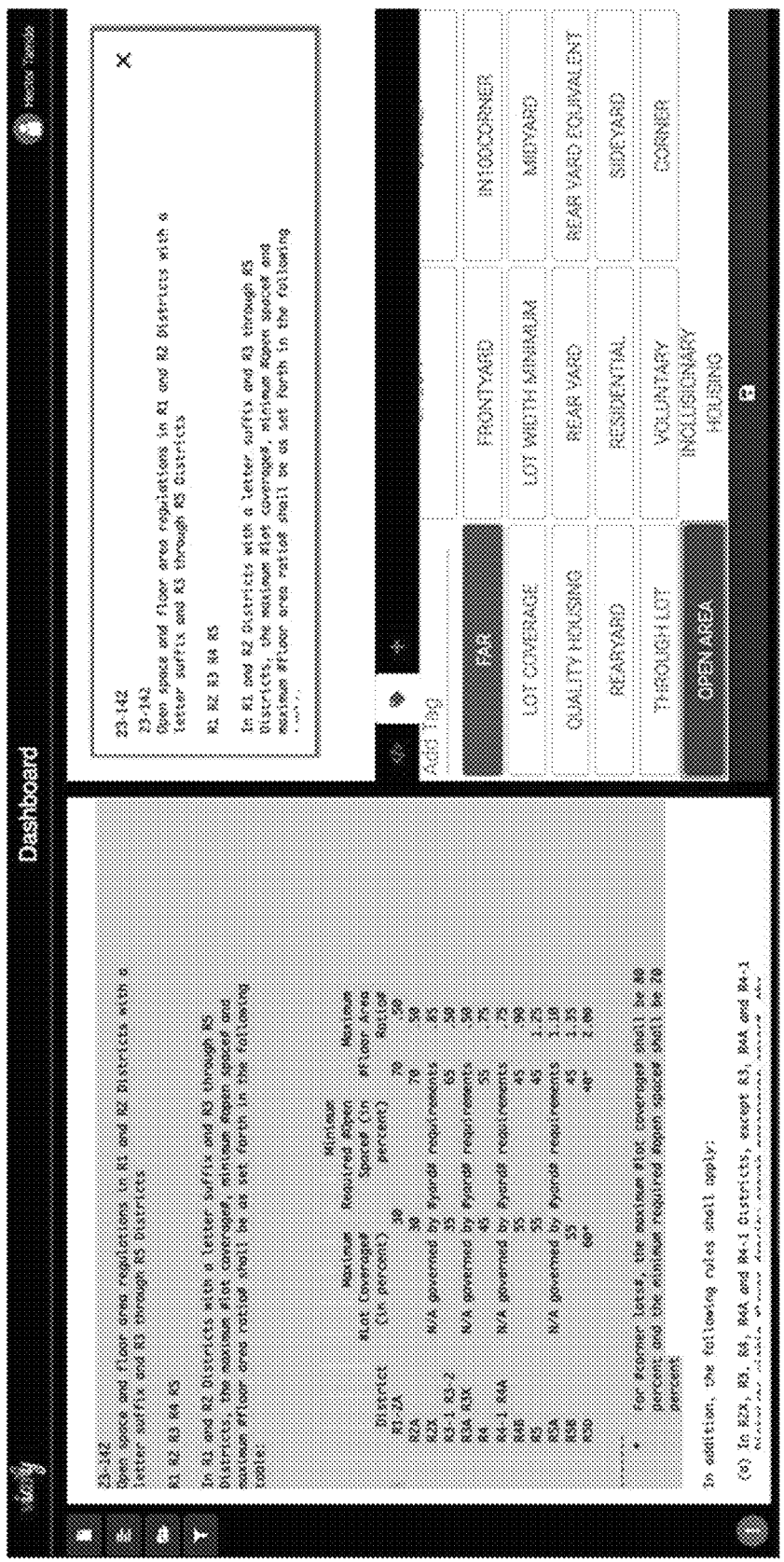
FIG. 4B is an example of manually tagging the selected sub section with Zoning behavior tags.
Figure 4C:
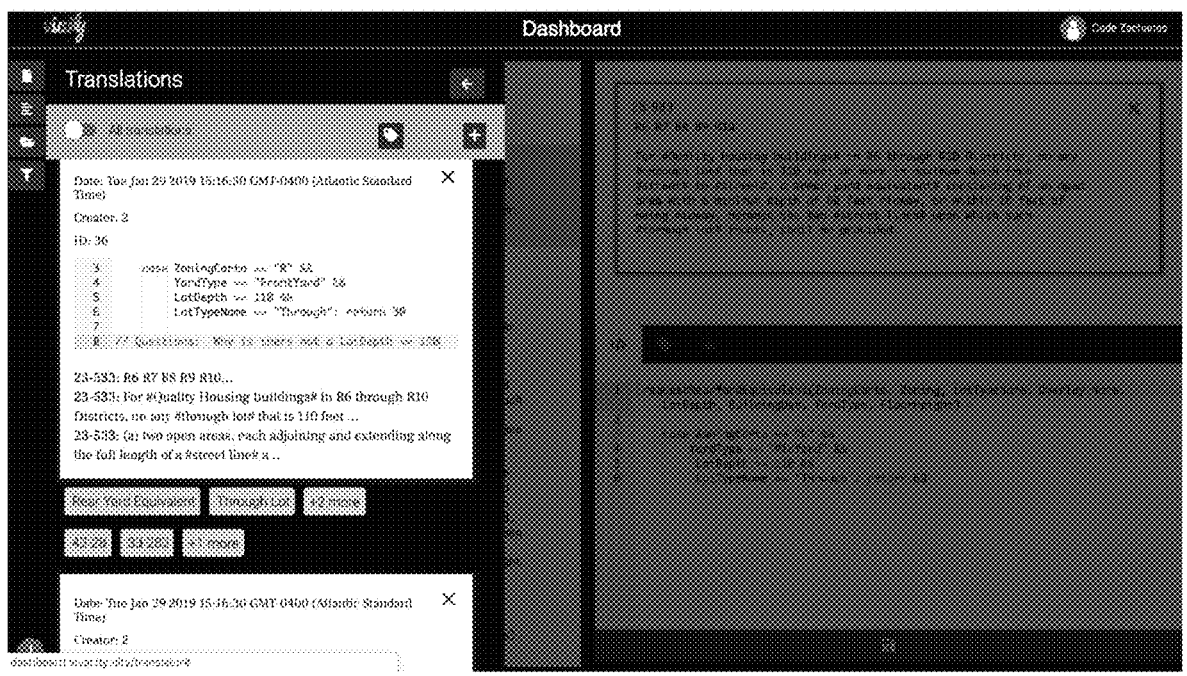
FIG. 4C is an example of the saved text translation showing the zoning tags and keywords associated to the supervised translation, displayed on a dashboard of a system in accordance with the disclosure herein.

At 204, the raw zoning ordinance of the document is parsed to establish a hierarchical structure using a parser algorithm. Any standard text parser can be used. This is accomplished by identifying regular expressions in the zoning chapters hierarchy. Filters can be applied using Python Regex, as illustrated in FIG. 4A and FIG. 4C, with tagging illustrated in FIG. 4B. The algorithm then proceeds to extract reference zoning ordinance chapters that possibly point to different chapters in the zoning ordinance. The raw text for each subsection of the zoning ordinance, the zoning chapter identification, and the referenced zoning ordinance and chapters are stored in a data dictionary, as exemplified in FIG. 5.

At 206, the algorithm also builds a network map of how each zoning ordinance subsection relates to the zoning ordinance sections and chapters using data dictionary keys stored in the data dictionary. The user manually establishes what the interpretation hierarchy of the zoning ordinance applied to a zoning lot (Example: Whether a special district overrides a commercial zone, or whether an overlay trumps a residential subsection). The hierarchy is saved to the network as a different attribute for later use when assembling the zoning ordinance document, as represented in FIG. 6A and FIG. 6B. The network map is needed to reassemble the translated document following the hierarchical order of the original document. It is also needed to understand the hierarchical order of how zoning ordinances are applied.

At 208 a corpus of examples is collected. Zoning text is translated into machine code, and each operation of the machine code is linked to the exact text from which it was created. Many of the operations in the machine code are repeated setting for checking of certain attributes. The logical structure of the zoning ordinance can typically be reduced to a series of if/then statements surrounding a finite set of attributes. The purpose of this step is to associate the specific pieces of text to corresponding elements of the zoning ordinance. The relationships between the text and the machine translation.

Appendix A is a specific example of how this is done can be observed. The example is taken from the New York Zoning Resolution. A passage is taken directly from the zoning ordinance, the pieces of that text which form lines of code are extracted, patterns to capture those pieces of text are extracted, and those lines of code are then arrange into processable machine code.

At 210, a language model is constructed by examining the corpus of 208 per attribute and extracting the pattern which unites all the examples. In this way, the model is able to use these patterns to write code operations directly from the text. The first step is to create patterns which recognize in the zoning ordinance the basic operations such as checking the state of a variable and setting an attribute. This is done by accumulating many variations in phrasing for a specific attribute or operation and then creating a pattern which recognizes them all. The generalizability of the language model from one city to the next depends on the ability to adjust the pattern to account for different phrasing structures used in different zoning documents. What remains the same is a basic set of attributes which must be extracted, and the workflow of extracting basic operations and linking them. In this regard, reference is made to Appendix A.

Previously, it was required that a person read through the section in question and have an understanding of the attributes for which they are looking. The person would need to know the ways that the attributes are phrased, and be able to identify them correctly. Furthermore, a person would need to physically write down the pieces of code in question. There is a time cost to this, as well as tedious mental fatigue. However, in accordance with the disclosure herein, the process of identifying the attributes automatically prepares the reader for what exactly they are looking for and writes the correct values. This results in a great reduction of both time and mental exhaustion.

The patterns used to extract attributes are constructed using a mixture of Regex patterns, SpaCy processing, and algorithmic linking. They leverage the consistent use of grammar and the restricted vocabulary of legalese. This is important as it allows the different phrasings of an attribute to be accounted for and enumerated.

At 212, the language model is run on each subsection of the zoning text. For each subsection in the parsed zoning text, the attributes are extracted using the model from 210, and relationships are established between attributes by the language model created above. A suggested code translation is displayed to the user in a digestible pythonic format. Thus, this is a corrective phase of the process, where users supervise for the accuracy of the model.

A reduction in complexity comes in the next step. With the attributes extracted automatically, the user's task becomes to organize them in the correct logical flow. This amounts to validating the extracted code and attaching AND/OR relationships between them. It allows the user's mental energy to be used on the more important process of making correct logical relationships.

At 214, references to previously translated sections of the zoning ordinance are correlated. In the cases where a section is referenced, the algorithm will have access to sections which have already been translated and will suggest code from the rules previously created when the language model was run at 212. This is how previously confirmed work is used to quickly inform new translations.

At 216, the zoning text is output as a data dictionary with sections interpreted as machine readable code. The subsections that are translated into machine readable code as data dictionaries that can be used directly in any three-dimensional modeling software to parametrically represent the translated code. An example is provided in Appendix B. In order to retain the hierarchical order of the translations, the output machine readable code is stored in data dictionaries or sections thereof that correspond to the subsection chapters.

Figure 5:
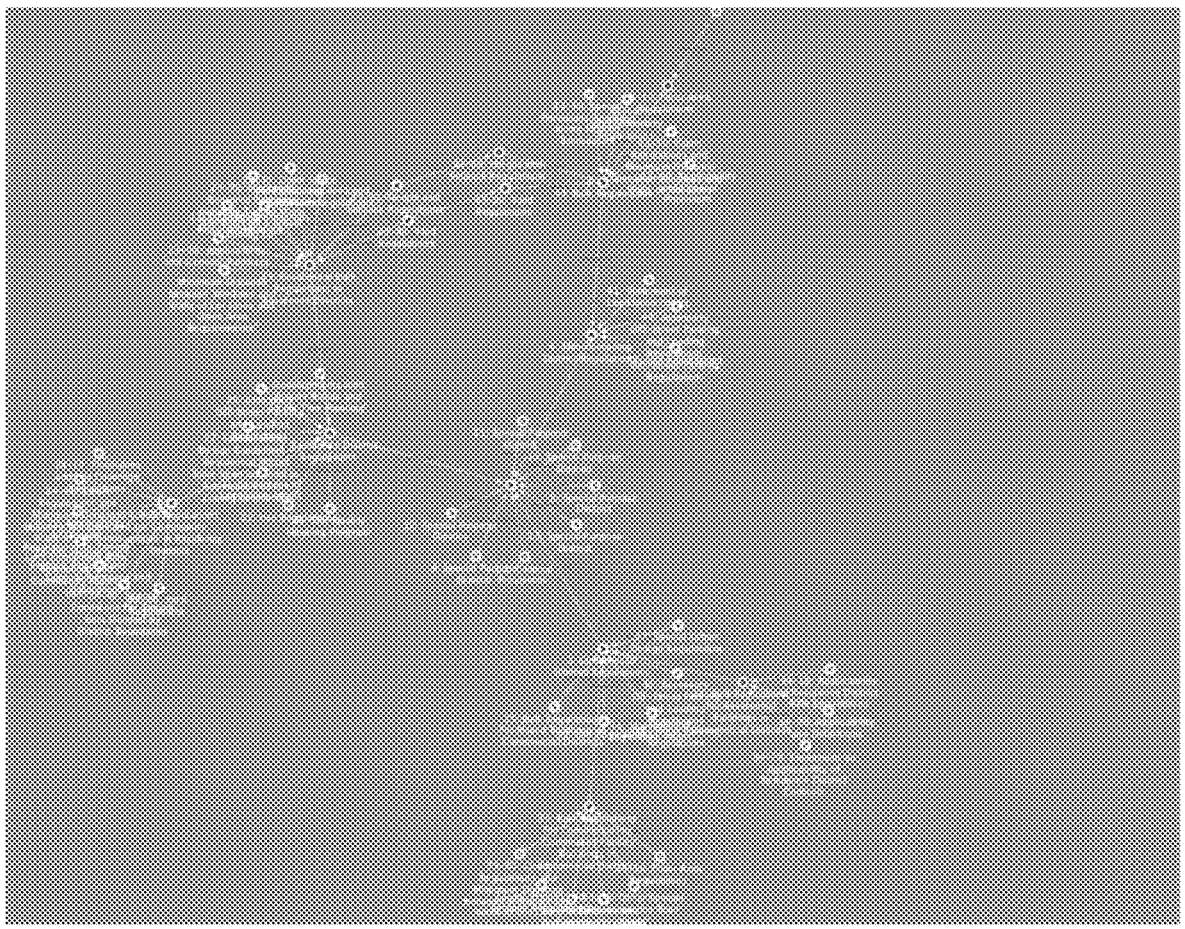
FIG. 5 is an example of a zoning text data dictionary as an ordered and hierarchical network.

At 218, simplified language sentences (for example in ordinary English) are outputted from the data dictionary of FIG. 5. The subsections that are translated into machine readable code as data dictionaries are translated into simple logical English sentences. These simple logical sentences when combined constitute a lossless summary of the subsection. An example is provided in Appendix C. In order to retain the hierarchical order of the translations, simplified language sentences are stored in data dictionaries, or portions thereof, that correspond to the subsection chapters.

At 220, simplified language and/or machine readable code sections are provided as an assembled document, following the organizational structure of the original document and/or the hierarchical organizational structure established by the user at 206. At this point, images associated with the corresponding section of the zoning ordinance may be retrieved using their tags and included in the assembled document. The assembled document is the final product that is used to verify lossless translation to machine code. The assembled document may be distributed by electronic transmission, printing or may be stored for later retrieval.

The output produced by the system and method disclosed herein can be utilized in provisional patent application Ser. No. 62/638,776, entitled A METHOD AND SYSTEM FOR PARAMETRICALLY CREATING AN OPTIMAL THREE DIMENSIONAL BUILDING STRUCTURE, filed on Mar. 5, 2018, and corresponding non-provisional patent application Ser. No. 16/288,297 filed on Feb. 28, 2019, now U.S. Pat. No. 10,818,082, issued on Oct. 27, 2020. These applications are hereby incorporated herein by reference, for all purposes, in their entireties.

It will be understood that the disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof

What is claimed is:

1. A computerized method for analyzing a zoning ordinance comprising:
   converting text of a zoning ordinance into a raw text format;
   parsing the raw text format to establish a hierarchical structure;
   building a network map representation of the text of the zoning ordinance based on said hierarchical structure;
   building a language model of each subsection of the text of the zoning ordinance; running the language model on each subsection of the text of the zoning ordinance; correlating references to previously translated sections of the text of the zoning ordinance based on the network map representation;
   using the network map representation to output text of the zoning ordinance as a data dictionary with sections interpreted as machine readable code provided by selecting a passage of the text of the zoning ordinance, converting portions of the passage that are convertible to lines of code, and arranging the lines of code into computer processable machine readable code; and outputting simplified language sentences from the data dictionary.

2. The method of claim 1, further comprising: assembling a document including at least one of the machine-readable code and the simplified language sentences; and making the document available for use.

3. The method of claim 2, wherein making the document available for use comprises at least one of printing, digitally transmitting to a user, and storing the document for later use.

4. The method of claim 2, further comprising: separating at least one of images, tables or sketches from text when the zoning ordinance contains said at least one of images, tables or sketches; tagging said at least one of the images, tables or sketches to provide at least one of tagged images, tagged tables or tagged sketches; and storing the at least on of tagged images, tagged tables or tagged sketches.

5. The method of claim 4, further comprising: retrieving said tagged images, tagged tables or tagged sketches associated with a portion of the text of the zoning ordinance corresponding to the assembled documents; and including the tagged images, tagged tables or tagged sketches that have been retrieved in the assembled document based on said hierarchical structure.

6. The method of claim 1, wherein the machine readable code comprises if and then statements representative of the structure of at least a portion of the zoning ordinance.

7. The method of claim 1, further comprising inspecting the results of running the language model to assure the accuracy of the model.

8. The method of claim 7, further comprising correcting the language model if an error is found.

9. The method of claim 1, further comprising training the language model to establish a link between syntactic dependency of a sentence and abstract sentential logic that captures high-level logic of the sentence.

10. The method of claim 9, further comprising providing the simplified sentences as computer code following propositional logic.

11. The method of claim 10, further comprising providing a visual representation of both the abstract propositional logic and syntactic dependency.

12. The method of claim 1, wherein the language model is run on each subsection of the zoning text by running SpaCy.

13. The method of claim 12, further comprising, for each subsection in the parsed zoning text:
tokenizing the sentences; and establishing a semantic representation of each sentence.

14. The method of claim 13, further comprising, for each sentence, establishing an abstractive summary of the text.

15. The method of claim 14, wherein establishing the abstractive summary of the text comprises building a SpaCy language model.

16. The method of claim 1, wherein storing the text in a data dictionary comprises storing, for each subsection of the zoning ordinance, the zoning chapter identification, and the referenced zoning ordinance and chapters.

17. The method of claim 1, wherein said language model is built by analyzing collected examples of the zoning ordinance.

18. A computerized system for analyzing a zoning ordinance, the system including:

a processor and a memory containing instructions for causing the processor to execute steps of:

converting text of a zoning ordinance into a raw text format;

parsing the raw text format to establish a hierarchical structure;

building a network map representation of the text of the zoning ordinance based on said hierarchical structure;

building a language model of each subsection of the text of the zoning ordinance; running the language model on each subsection of the text of the zoning ordinance; correlating references to previously translated sections of the text of the zoning ordinance based on the network map representation;

using the network map representation to output text of the zoning ordinance as a data dictionary with sections interpreted as machine readable code provided by selecting a passage of the text of the zoning ordinance, converting portions of the passage that are convertible to lines of code, and arranging the lines of code into computer processable machine readable code; and outputting simplified language sentences from the data dictionary.

19. The computerized system of claim 18, wherein the processor executes the step of:

assembling a document including at least one of the machine-readable code and the simplified language sentences; and making the document available for use.

20. The computerized system of claim 19, wherein the processor executes the step of:

separating at least one of images, tables or sketches from text when the zoning ordinance contains said at least one of images, tables or sketches; tagging said at least one of the images, tables or sketches to provide at least one of tagged images, tagged tables or tagged sketches; and storing the at least on of tagged images, tagged tables or tagged sketches.

21. The method of claim 20, wherein the processor executes the step of:

retrieving said tagged images, tagged tables or tagged sketches associated with a portion of the text of the zoning ordinance corresponding to the assembled documents; and including the tagged images, tagged tables or tagged sketches that have been retrieved in the assembled document based on said hierarchical structure.

22. The computer system of claim 18, wherein said language model is built by analyzing collected examples of the zoning ordinance.

23. A computer readable non-transitory storage medium storing instructions of a computer program which, when executed by a computer system having a processor, results in performance of a method for analyzing a zoning ordinance, comprising the steps of:

converting text of a zoning ordinance into a raw text format;

parsing the raw text format to establish a hierarchical structure;

building a network map representation of the text of the zoning ordinance based on said hierarchical structure;

building a language model of each subsection of the text of the zoning ordinance; running the language model on each subsection of the text of the zoning ordinance; correlating references to previously translated sections of the text of the zoning ordinance based on the network map representation;

using the network map representation to output text of the zoning ordinance as a data dictionary with sections interpreted as machine readable code provided by selecting a passage of the text of the zoning ordinance, converting portions of the passage that are convertible to lines of code, and arranging the lines of code into computer processable machine readable code; and outputting simplified language sentences from the data dictionary.

24. The computer readable non-transitory storage medium of claim 23, wherein the method for analyzing the zoning ordinance performs the step of:

assembling a document including at least one of the machine-readable code and the simplified language sentences; and making the document available for use.

25. The computer readable non-transitory storage medium of claim 24, wherein the method for analyzing the zoning ordinance performs the step of:

separating at least one of images, tables or sketches from text when the zoning ordinance contains said at least one of images, tables or sketches; tagging said at least one of the images, tables or sketches to provide at least one of tagged images, tagged tables or tagged sketches; and storing the at least on of tagged images, tagged tables or tagged sketches.

26. The computer readable non-transitory storage medium of claim 25, wherein the method for analyzing the zoning ordinance performs the step of:

retrieving said tagged images, tagged tables or tagged sketches associated with a portion of the text of the zoning ordinance corresponding to the assembled documents; and including the tagged images, tagged tables or tagged sketches that have been retrieved in the assembled document based on said hierarchical structure.

27. The computer readable non-transitory storage medium of claim 23, wherein said language model is built by analyzing collected examples of the zoning ordinance.

\* \* \* \* \*